(12) United States Patent
Sato et al.

(10) Patent No.: US 8,658,758 B2
(45) Date of Patent: Feb. 25, 2014

(54) PROCESS FOR PRODUCING ALIPHATIC POLYESTER REDUCED IN RESIDUAL CYCLIC ESTER CONTENT

(75) Inventors: Hiroyuki Sato, Fukushima-Ken (JP); Fuminori Kobayashi, Fukushima-Ken (JP); Yukichika Kawakami, Fukushima-Ken (JP); Kazuyuki Yamane, Fukushima-Ken (JP); Yoshikazu Amano, Ibaraki-Ken (JP); Takashi Sato, Ibaraki-Ken (JP)

(73) Assignee: Kureha Corporation, Tokyo (JP)

( * ) Notice: Subject to any disclaimer, the term of this patent is extended or adjusted under 35 U.S.C. 154(b) by 955 days.

(21) Appl. No.: 10/593,230

(22) PCT Filed: Mar. 17, 2005

(86) PCT No.: PCT/JP2005/004771
§ 371 (c)(1),
(2), (4) Date: Nov. 13, 2006

(87) PCT Pub. No.: WO2005/090438
PCT Pub. Date: Sep. 29, 2005

(65) Prior Publication Data
US 2007/0244293 A1    Oct. 18, 2007

(30) Foreign Application Priority Data
Mar. 18, 2004  (JP) .................. 2004/078306

(51) Int. Cl.
*C08G 63/08*  (2006.01)

(52) U.S. Cl.
USPC ............ 528/354; 528/359; 528/480; 528/483

(58) Field of Classification Search
USPC ........................ 528/272, 354, 359, 480, 483
See application file for complete search history.

(56) References Cited

U.S. PATENT DOCUMENTS

| 3,565,869 A | 2/1971 | De Prospero |
| 5,853,639 A | 12/1998 | Kawakami et al. |
| 6,429,280 B1 | 8/2002 | Hiraoka et al. |
| 6,528,617 B1* | 3/2003 | Terado et al. ............ 528/480 |
| 2003/0125431 A1* | 7/2003 | Yamane et al. .......... 524/120 |

FOREIGN PATENT DOCUMENTS

| JP | 08-231688 | 9/1996 |
| JP | 8-269175 | 10/1996 |
| JP | 9-124778 | 5/1997 |
| JP | 2001-151878 | 6/2001 |
| JP | 2003-238672 | 8/2003 |
| WO | 03/037956 | 5/2003 |

OTHER PUBLICATIONS

Supplementary European Search Report dated Apr. 4, 2008 in EP Application No. 05 72 6648 corresponding to the present U.S. application.
Form PCT/IB/338 together with International Preliminary Report on Patentability and English translation of PCT Written Opinion issued Sep. 19, 2006 in connection with the PCT Application PCT/JP2005/004771 corresponding to the present U.S. application.

* cited by examiner

*Primary Examiner* — Ling Choi
*Assistant Examiner* — Gennadiy Mesh
(74) *Attorney, Agent, or Firm* — Wenderoth, Lind & Ponack, L.L.P.

(57) ABSTRACT

In the production of an aliphatic polyester by ring-opening polymerization of a cyclic ester, at least a latter period of polymerization is proceeded with by way of solid-phase polymerization, and the resultant aliphatic polyester is subjected to removal of residual cyclic ester. As a result, an aliphatic polyester with a minimized content of residual monomer is obtained.

5 Claims, No Drawings

US 8,658,758 B2

PROCESS FOR PRODUCING ALIPHATIC POLYESTER REDUCED IN RESIDUAL CYCLIC ESTER CONTENT

TECHNICAL FIELD

The present invention relates to a process for producing an aliphatic polyester, such as polyglycolic acid, by ring-opening polymerization of a cyclic ester, such as glycolide, and more particularly to a process for producing an aliphatic polyester with a reduced content of residual cyclic ester monomer.

BACKGROUND ART

Aliphatic polyesters, such as polyglycolic acid and polylactic acid, can be decomposed by microorganisms or enzymes present in nature, such as soil or sea water, so that they are noted as biodegradable polymer materials giving little load to the environment. Further, aliphatic polyesters are utilized as polymer materials for medical use, such as sutures for surgery or artificial skin, since they can be decomposed or absorbed in vivo.

Among the aliphatic polyesters, polyglycolic acid is excellent in gas-barrier properties, such as oxygen gas-barrier property, carbon dioxide gas-barrier property and water vapor-barrier property and also excellent in heat resistance and mechanical properties, and therefore the development of new use thereof is under way singly or in a composite state together with another resin material in the fields of packaging materials, etc.

An aliphatic polyester can be synthesized by dehydropolycondensation of an α-hydroxycarboxylic acid, such as glycolic acid or lactic acid, but in order to effectively synthesize an aliphatic polyester of a high molecular weight, there has been generally adopted a process of synthesizing a bimolecular cyclic ester of an α-hydroxycarboxylic acid and subjecting the cyclic ester to ring-opening polymerization. For example, by ring-opening polymerization of glycolide that is a bimolecular cyclic ester or cyclic diester of glycolic acid, polyglycolic acid is obtained. By ring-opening polymerization of lactide that is a bimolecular cyclic ester of lactic acid, polylactic acid is obtained.

The polymerization process for producing an aliphatic polyester by ring-opening polymerization of a cyclic ester is generally performed in the form of melt-polymerization where all the steps are operated above the melting point of the product aliphatic polyester, and the present inventors, et. al., have proposed a process wherein the latter half step of the ring-opening polymerization of cyclic ester is performed in a reactor of relatively thin tubes to effect solid-phase polymerization (Patent Document 1 listed below). By adopting the solid-phase polymerization, it becomes possible to attain an advantage that the product polyester is easily recovered in the form of lumps while causing a volumetric shrinkage and release thereof to be released from the inner surfaces of the tubes.

However, in the ring-opening polymerization of a cyclic ester including the above-mentioned case of solid-phase polymerization, it is inevitable that some amount (referred to as 2-8% in Patent Documents 2-4 shown below) of non-reacted cyclic ester monomer remains in the product aliphatic polyester. The residual monomer causes a lowering in melt-extrudability and stretchability of the product aliphatic polyester and also degradation or fluctuation of properties of the product obtained therefrom (e.g., cutting of filaments or local lowering of properties of films), so that it is desirable to reduce the residual monomer as small an amount as possible. For this reason, several methods have been proposed in order to reduce the residual monomer in the product polymers (e.g., Patent Documents 2-4 shown below). For example, Patent Document 2 discloses a process wherein a high-temperature dry gas is caused to contact particles of product polyester (milled product), thereby providing polyglycolic acid with a reduced residual monomer down to possibly ca. 0.2%. Further, Patent Document 3 describes that the process of Patent Document 2 is inefficient because the process requires a treatment time of several tens of hours in order to achieve a reduction down to 2% or less, and proposes a reduced pressure treatment of a resultant polymer in a molten state. Patent Document 4 also proposes a reduced pressure treatment of a resultant polymer in a molten state.

Patent Document 1: WO-A 03/006526
Patent Document 2: U.S. Pat. No. 3,565,869
Patent Document 3: JP-A 3-14829
Patent Document 4: JP-A 9-12690

However, according to any of the processes of the above-mentioned Patent Documents, the reduction of residual monomer was insufficient and it was difficult to obtain an aliphatic polyester with a residual monomer of 0.3 wt. % or less, so adverse effects thereof to the lowering in properties of the aliphatic polyesters remained to be a non-ignorable level.

DISCLOSURE OF INVENTION

Accordingly, a principal object of the present invention is to provide a process for producing an aliphatic polyester with a minimized content, more specifically a securely reduced amount of less than 0.2 wt. %, of residual monomer.

Having been developed in order to achieve the above-mentioned object, the process for producing an aliphatic polyester with a reduced content of residual cyclic ester according to the present invention, comprises: producing an aliphatic polyester by ring-opening polymerization of a cyclic ester, wherein a latter half of polymerization period is proceeded with by way of solid-phase polymerization, and the resultant aliphatic polyester is subjected to removal of the residual cyclic ester by release to a gaseous phase.

A history through which the present inventors have arrived at the present invention as a result of study with the above-mentioned object, is briefly described. According to the present inventors' study, a principal reason for the failure in the processes for producing aliphatic polyesters including a treatment step for removal of residual monomer of Patent Documents 2-4 is attributable to the fact that the whole process of ring-opening polymerization of a cyclic ester was performed by way of melt polymerization. More specifically, in the processes disclosed in these documents, a method of raising the temperature of polymerization system in the final stage of polymerization is adopted in order to complete the polymerization and maintain the molten state of the system so as to facilitate the withdrawl of the polymerizates. However, while it per se is a known matter in the art, the ring-opening polymerization of a cyclic ester, either glycolide or lactide, is an equilibrium reaction involving a competition of polymerization of monomer→polymer and de-polymerization of polymer→monomer, and in the final stage of the polymerization, the influence of the de-polymerization (i.e., so-called end-biting reaction of producing cyclic ester monomers from a polymer terminal as a starting point) cannot be ignored. This is a reason why the polymerization is not completed in the above-mentioned polymerization systems, whereas the raising of temperature in the final stage of polymerization rather results in a lowering of equilibrium polymerization conversion to increase the residual monomer. Accordingly, even if the resultant aliphatic polyester containing such an increased amount of residual monomer is subjected to a residual monomer removal step, it is difficult to attain an effective monomer removal effect also with occurrence of de-polymerization at the temperature of the residual monomer removal step. In contrast thereto, according to solid-phase polymerization at a suppressed temperature adopted in the final polymerization stage as in the present invention, the equilibrium favors the suppression of de-polymerization, and if the aliphatic polyester containing a suppressed amount of residual monomer thus formed in the polymerization step is subjected to an appropriate residual monomer removal step, it becomes possible to obtain an aliphatic polyester with as small an amount as possible of residual monomer. (This will be clearly understood from a comparison of Examples and Comparative Examples appearing hereinafter.)

Further, it has been also confirmed possible to attain a remarkable improvement in moistures resistance (lowering in hydrolyzation rate) of the resultant aliphatic polyester by reducing the amount of residual monomer and low-molecular weight fraction in the aliphatic polyester according to the present invention.

BEST MODE FOR PRACTICING THE INVENTION

1. Cyclic Ester

Preferred cyclic esters used in the present invention may include cyclic diesters of α-hydroxycarboxylic acids and lactones. Examples of the α-hydroxycarboxylic acids providing the cyclic diesters may include: glycolic acid, L- and/or D-lactic acid, α-hydroxybutanoic acid, α-hydroxyisobutanoic acid, α-hydroxyvaleric acid, α-hydroxycaproic acid, α-hydroxy-isocaproic acid, α-hydroxyheptanoic acid, α-hydroxy-octanoic acid, α-hydroxydecanoic acid, α-hydroxymyristic acid, α-hydroxystearic acid, and alkyl-substituted products thereof.

Examples of the lactones include β-propiolactone, β-butyrolactone, pivalolactone, γ-butyrolactone, δ-valerolactone, β-methyl-δ-valerolactone and ε-caprolactone. The cyclic etheresters may include dioxanone, for example.

A cyclic ester having an asymmetric carbon atom may be any of a D-isomer, an L-isomer and a racemic mixture of these. These cyclic esters may be used either singly or in any combination thereof. When 2 or more cyclic esters are used in combination, an arbitrary aliphatic copolyester can be obtained. The cyclic ester may be copolymerized with another comonomer. Examples of such another comonomer include cyclic monomers such as trimethylene carbonate and 1,3-dioxanone.

Among the cyclic esters, glycolide, which is a cyclic diester of glycolic acid, L- and/or D-lactide, which is a cyclic diester of L- and/or D-lactic acid, and mixtures thereof are preferred, with glycolide being more preferred. Glycolide may be used alone. However, it may also be used in combination with another cyclic monomer to produce a polyglycolic acid copolymer (copolyester). When the polyglycolic acid copolymer is produced, it is desirable that a proportion of glycolide copolymerized is preferably at least 70% by weight, more preferably at least 80% by weight, particularly preferably at least 90% by weight from the viewpoint of physical properties of the copolyester formed, such as crystallinity and gas-barrier properties. As a preferable example of the cyclic monomer copolymerized with glycolide, lactide is raised.

No particular limitation is imposed on the production process of the cyclic ester. For example, glycolide can be obtained by a process comprising depolymerizing a glycolic acid oligomer. As the depolymerization process of the glycolic acid oligomer, may be adopted, for example, a melt depolymerization process described in U.S. Pat. No. 2,668,162, a solid-phase depolymerization process described in JP-A 2000-119269, or a solution-phase depolymerization process described in JP-A 328481/1997 and WO 02/14303A1. Glycolide obtained as a cyclic condensate of a chloroacetic acid salt, which is reported in K. Chujo, et al., Die Makromolekulare Cheme, 100(1967), 262-266, can also be used.

Among the depolymerization processes described above, the solution-phase depolymerization process is preferred for obtaining glycolide. According to the solution-phase depolymerization process, (1) a mixture containing a glycolic acid oligomer and at least one high-boiling polar organic solvent having a boiling point within a range of 230-450° C. is heated to a temperature, at which the depolymerization of the oligomer takes place, under ordinary pressure or under reduced pressure; (2) the oligomer is dissolved in the solvent until a residual rate (volume ratio) of a melt phase of the oligomer reaches 0.5 or lower, (3) the heating is further continued at the same temperature to depolymerize the oligomer, (4) a cyclic diester (i.e., glycolide) formed is distilled out together with the high-boiling polar organic solvent, and (5) glycolide is recovered from the distillate.

Examples of the high-boiling polar organic solvent may include aromatic carboxylic acid esters, such as bis(alkoxyalkyl) phthalates such as di(2-methoxyethyl) phthalate, alkylene glycol dibenzoates such as diethylene glycol dibenzoate, benzylbutyl phthalate, and dibutyl phthalate; aromatic phosphoric acid esters such as tricresyl phosphate; and polyalkylene glycol ethers such as polyethylene dialkyl ethers. The high-boiling polar organic solvent is generally used in an amount of 0.3 to 50 times the weight of the oligomer. Polypropylene glycol, polyethylene glycol, tetraethylene glycol or the like may be used as a solubilizing agent for the oligomer in combination with the high-boiling polar organic solvent as needed. The depolymerization temperature of the glycolic acid oligomer is generally 230° C. or higher, preferably 230 to 320° C. Although the depolymerization is performed under atmospheric pressure or reduced pressure, it is preferable to heat the oligomer under a reduced pressure of 0.1 to 90.0 kPa (1 to 900 mbar) to depolymerize it.

2. Polymerization

For producing an aliphatic polyester by using a cyclic ester, it is preferred to adopt a process of heating the cyclic ester to effect ring-opening polymerization. The ring-opening polymerization is performed as a substantially bulk polymerization. The ring-opening polymerization is ordinarily performed at a temperature of at least 100° C. in the presence of a catalyst but, according to the present invention, the temperature therefore is controlled to be preferably below 190° C., more preferably 140-185° C., further preferably 160-180° C., at least in the final stage of polymerization (preferably at a monomer conversion of at least 50%) so that the system is placed in a solid phase.

No particular limitation is imposed on the catalyst so far as it may be used as a ring-opening polymerization catalyst for respective cyclic esters. Specific examples of such catalysts include metallic compounds such as oxides, chlorides, carboxylates and alkoxides of tin (Sn), titanium (Ti), aluminum (Al), antimony (Sb), zirconium (Zr) and zinc (Zn). More specifically, preferable examples thereof include tin compounds such as tin halides (for example, tin dichloride, tin tetrachloride, etc.) and organic tin carboxylates (for example, tin octanoates such as tin 2-ethylhexanoate); titanium compounds such as alkoxytitanium; aluminum compounds such as alkoxyaluminum; zirconium compounds such as zirconium acetylacetone; and antimony halides. However, these are not exhaustive.

The amount of the catalyst used may be in a small amount relative to the cyclic ester and is selected from a range of generally 0.0001 to 0.5 wt. %, preferably 0.001 to 0.1 wt. % based on the cyclic ester.

As has been proposed in a prior application (PCT/JP2004/016706) by the present inventors, et al., it is preferred to subject a cyclic ester containing a proton-source compound including water and an alcohol as initiators and molecular weight-adjusting agents to ring-opening polymerization based on a total proton concentration and a ratio (carboxylic acid/ester mol ratio) between a mol concentration of carboxyl (carboxylic acid)-source compound including water and a mol concentration of alkoxycarbonyl(ester)-source compound, as polymerization-controlling indexes. More specifically, it is preferred to effect the ring-opening polymerization while controlling the carboxylic acid/ester mol ratio within a range of 100/0-2/98, more preferably 99/1-5/95.

In the present invention, an alcohol and optional additional water are added to a cyclic ester purified down to a water content of preferably at most 60 ppm to adjust the total proton concentration and the ratio (hereinafter referred to as the "carboxylic acid/ester mol ratio") between a mol concentration of the carboxyl(carboxylic acid)-source compounds including water and a mol concentration of the alkoxycarbonyl(ester)-source compounds including alcohol in the cyclic ester, thereby controlling the molecular weight of an aliphatic polyester formed. The total proton concentration in the cyclic ester is controlled within a range of preferably higher than 0.09 mol %, but lower than 2.0 mol %, more preferably 0.1 to 1.0 mol % by adding an alcohol and optional additional water to the purified cyclic ester.

Further, by controlling the amounts of the added alcohol and optional additional water, the carboxylic acid/ester mol ratio is controlled at preferably 100/0-2/98, more preferably 99/1-5/95, further preferably 99/1-10/90.

If the carboxylic acid/ester mol ratio is below 2/98, the amount of alcohol species used in the polymerization becomes large and is liable to remain untreated to result in large fluctuation of molecular weight and melt-viscosity during melt-processing of the resultant polymer, thus making it difficult to provide a shaped product of desired properties (molecular weight, melt-viscosity, etc.). Further, the reaction with a stabilizer and a terminal capping agent added at the time of the melting to result in large fluctuations of physical properties and hydrolyzation rate of the shaped product.

Examples of the alcohol added as a proton-source compound and an alkoxycarbonyl(ester)-source compound may include: lower and medium alcohols which are aliphatic alcohols having 1-5 carbon atoms, and higher alcohols which are aliphatic alcohols having 6 or more carbon atoms. These aliphatic alcohols can have a branched structure. Further, alicyclic alcohols, unsaturated alcohols, aromatic alcohols and polyols are also included. Further, it is also possible to use hydroxycarboxylic acids having a hydroxyl group and esters thereof such as methyl glycolate and methyl lactate, and also saccharides.

Preferred among these are medium or higher alcohols having at least 3 carbon atoms, such as propanol, 2-propanol, butanol, 2-butane-ol, t-butyl alcohol, octyl alcohol, dodecyl alcohol (lauryl alcohol) and myristyl alcohol, alicyclic alcohols, such as cyclohexanol; diols, such as ethylene glycol, butane diol and hexane diol; and triols, such as glycerin, in view of the solubility in the monomer, in view of the solubility in the monomer, reactivity (initiator efficiency), boiling point and commercial availability. These alcohols can be used in two or more species in combination.

In a preferred embodiment of the present invention, it is preferred to adopt a process wherein a cyclic ester is heat-melted in the presence of a catalyst in a melting vessel, then transferring the cyclic ester in a molten state into a polymerization apparatus equipped with a plurality of tubes each capable of opening and closing at both ends and effecting ring-opening polymerization in a closed state in each tube to precipitate the resultant polymer, thus effecting solid-phase polymerization in a latter period; or a process of proceeding with ring-opening polymerization of a cyclic ester in a reaction vessel equipped with a stirrer, then withdrawing the resultant polymer to once solidify the polymer by cooling and then continuing solid-phase polymerization below the melting point of the polymer in a latter stage. The polymerization time can vary depending on the polymerization temperature, etc., but may ordinarily be 30 min. to 50 hours, more preferably 1-30 hours, to attain as high a polymerization conversion as possible. By controlling the polymerization temperature in a hermetically closed system, it becomes possible to produce a polymer having objective properties, such as molecular weight and melt viscosity, in a stable manner and at a good reproducibility.

According to the process of the present invention, polyglycolic acid having a melt viscosity of preferably 50 to 6,000 Pa·s, more preferably 100 to 5,000 Pa·s as measured at a temperature of 240° C. and a shear rate of 121 sec$^{-1}$ can be provided by ring-opening polymerization of a cyclic ester (for example, glycolide or a cyclic ester comprising glycolide as a main component). According to the process of the present invention, a high-molecular weight aliphatic polyester having a weight-average molecular weight of preferably at least 50,000, more preferably 80,000, particularly preferably at least 100,000 can be produced. The upper limit of the weight-average molecular weight is about 500,000, preferably about 300,000.

In the process of the present invention, the polymerization temperature is controlled so as to effect solid-phase polymerization in a final period of polymerization, so that it is possible to obtain a polymer of a high molecular weight and also a low degree of yellowness. This is another characteristic.

3. Residuol Monomer Removal Step

According to the present invention, the aliphatic polyester obtained through the above-mentioned polymerization step is subjected to a residual monomer removal step, i.e., a step of removing the residual cyclic ester by release to a gas phase. More specifically the polymer in a solid or a molten state is caused to contact a heated dry gas or subjected to the action of a reduced pressure. In order to suppress the de-polymerization of the polymer possibly occurring also in this step, it is preferred to treat the polymerization in a solid particle state rather than in a molten state. Further, in order to treat a large mass, the flow contact of a dry gas under normal pressure is preferred rather than the application of a reduced pressure. In the present invention, as the residual monomer is reduced to ca. 0.3-0.8 wt. % in the polymerization step, the load of the residual monomer removal step is reduced, and even the treatment with heated dry gas under normal pressure can securely reduce the residual monomer to below 0.2 wt. %. The treatment temperature may preferably be 120-225° C., particularly 150-220° C. A treatment time on the order of 0.5-95 hours, particularly 1-48 hours, may be adopted. As the gas, it is of course possible to use an inert gas, such as nitrogen or argon, but commercially, dry air may be used advantageously.

In order to have the heated dry gas (or reduced pressure) effectively act on the polymer, the polymer may preferably be in the form of particles (including pellets) having a diameter (based on a longer axis) of at most 8 mm, particularly at most 5 mm, and in order to prevent the deterioration during the residual monomer removal treatment and improve the thermal stability during secondary processing, the polymer after polymerization may preferable be kneaded with a capping agent for a terminal, such as a carboxyl group or a hydroxyl group, and/or a thermal stabilizer, and pelletized.

As the carboxyl group-capping agent, it is possible to use compounds generally known as moisture resistance-improving agents for aliphatic polyesters such as polylactic acid. Examples thereof may include: carbodiimide compounds inclusive of monocarbodiimides and polycarbodiimides, such as N,N-2,6-diisopropulphenylcarbodiimides; oxazoline compounds, such as 2,2'-m-phenylene-bis(2-oxazoline), 2,2'-p-phenylenebis(2-oxazoline), 2,2-phenyl-2 oxazoline and styrene-isopropenyl-2-oxazoline; oxazine compounds, such as 2-methoxy-5,6-dihydro-4H-1,3-oxazine; and epoxy compounds, such as N-glycidyldiphthalimide and cyclohexene oxide. Among these, carbodiimide compounds are preferred. These carboxyl group-capping agents can be used in combination of two or more species, as desired, and may preferably be used in a proportion of 0.01-10 wt. parts, more preferably 0.1-2 wt. parts, particularly 0.3-1 wt. part, per 100 wt. parts of the aliphatic polyester.

As the thermal stabilizer, phosphoric acid esters having a pentaerythritol skeleton and phosphoric acid alkyl esters may preferably be used in a proportion of at most 3 wt. parts, more preferably 0.003-1 wt. part per 100 wt. parts of the aliphatic polyester.

It is also possible to add the above-mentioned carboxyl group-capping agent and thermal stabilizer during polymerization.

EXAMPLES

The present invention will hereinafter be described more specifically by the following Polymer Synthesis Examples, Pellet Production Examples, Release Removal Examples, Examples and Comparative Examples. Analyzing methods and measuring methods are as follows:

(1) Monomer Impurity Determining Analysis:

A precisely weighed amount (ca. 1 g) of glycolide and 50 mg of 4-cholorobenzophenone as an internal standard substance were added into 10 ml of high-purity acetone and sufficiently dissolved therein. Ca. 1 ml of the resultant solution was taken out, and an ethyl ether solution of diazomethane was added to the solution. The diazomethane solution was added in an amount of leaving a yellow color of diazomethane as an approximate measure. The yellow-colored solution (1 µl) was charged into a gas chromatograph to determine the amounts of methyl-esterified glycolic acid and glycolic acid dimmer on the basis of an area ratio of the internal standard substance and the amounts of the glycolide and internal standard substance added.
<Conditions of Gas Chromatographic Analysis>
Apparatus: Shimadzu GC-2010,
Column: TC-17 (0.25 mm in diameter×30 m in length),
Temperature of vaporizing chamber: 200° C.
Column temperature: After retained at 50° C. for 5 minutes, raising the temperature to 270° C. at a heating rate of 20° C./min and holding at 270° C. for 4 minutes
Detector: FID (flame ionization detector), temperature: 300° C.

With respect to lactide, impurities can be determined in the same manner as in glycolide.

Measurement of Water Content

A Karl Fischer's aquameter ("CA-100", made by Mitsubishi Kagaku K.K.) equipped with a vaporizer (VA-100") was used, and a precisely weighed amount (ca. 2 g) of a polymer sample was placed in the vaporizer preset to 220° C. and heated. A dry nitrogen gas was passed at a flow rate of 250 ml/min through the Karl Fischer's aquameter from the vaporizer. After the sample was introduced into the vaporizer, water vaporized was introduced into a Karl Fischer's solution. An end point was determined to be a point of time when an electric conductivity was lowered to +0.1 µg/sec. from the background. With respect to the determination of water in a monomer, the temperature of the vaporizer was preset to 140° C., and an end point was determined to be a point of time when an electric conductivity was lowered to +0.05 µg/sec. from the background.

(3) Method of Calculating Proton Concentration

A total proton concentration contained in a monomer is calculated based on a total amount of hydroxycarboxylic acid compounds and water contained in the monomer. Proton concentrations (mol %) attributable to hydroxycarboxylic acids were calculated based on the respective contents, molecular weights and numbers of hydroxyl groups of the respective compounds. On the other hand, a proton concentration attribute able to water is calculated based on a total amount of water as an impurity contained in the monomer moisture contained in the atmosphere of a monomer dissolution vessel and a protonic compound used as a polymerization initiation and the respective molecular weights. The moisture content was calculated by preliminarily flowing dry air into the monomer dissolution vessel to measure a relative humidity of the atmosphere, calculating an absolute moisture from a temperature of the atmosphere and effecting a calculation based on the absolute moisture value and the volume of the vessel.

(4) Residual Monomer Content

Ca. 300 mg of a sample was dissolved in ca. 6 g of dimethyl sulfoxide (DMSO) by heating at 150° C. for ca. 10 min., followed by cooling down to room temperature and filtration. To the filtrate liquid, prescribed amounts of 4-chlovobenzophenone and acetone as internal standard substances were added. Then, 2 µl of the resultant solution was injected into a GC apparatus to effect a measurement. From the measured value, a residual monomer content was calculated in terms of wt. % contained in the polymer.
<Conditions of GC Analysis>
Apparatus: Shimadzu GC-2010
Column: TC-17 (0.25 mm in diameter×30 m in length)
Column temperature: After retained at 150° C. for 5 min., raising the temperature to 270° C. at a rate of 20° C./min. and holding at 270° C. for 3 min.
Vaporization chamber temperature: 200° C.
Detector: FID (hydrogen flame ionization detector)
Temperature: 300° C.

(5) Melt Viscosity

A polymer sample was caused to contact dry air at 120° C. to lower the moisture content to 50 ppm or below. The melt viscosity measurement was performed by using "Capirograph 1-C" (made by K.K. Toyo Seiki) equipped with a capillary (1 mm in diameter×10 mm in length). Ca. 20 g of the sample was introduced into the apparatus heated to a set temperature of 240° C. and held for 5 min. and the melt viscosity was measured at a shear rate of 121 $\sec^{-1}$.

(6) Measurement of Molecular Weight:

An amorphous polymer was provided and dissolved in a solvent for measurement of a molecular weight. More specifically, ca. 5 g of a sample fully dried was held between aluminum plates, placed on a hot press heated to 275° C., heated for 90 seconds and then pressed for 1 min. under a pressure of 2 MPa. Thereafter, the polymer was immediately transferred to a water-circulating press machine to be cooled. Thus, a transparent amorphous pressed sheet was produced.

A sample (ca. 10 mg) was cut out of the thus-prepared pressed sheet. This sample was dissolved in 10 ml of a hexafluoroisopropanol (HFIP) solution containing 5 mM of sodium trifluoroacetate dissolved therein. After the sample solution was filtered through a membrane filter, 20 µl thereof was charged into a gel permeation chromatograph (GPC) to effect a molecular weight measurement.

<Conditions of GPC Measurement>
Apparatus: "Shodex-104", made by Showa Denko K.K.
Column: HEIP-806M, 2 columns and pre-column were connected in series,
Column temperature: 40° C.
Eluent: HFIP solution with 5 mM of sodium trifluoroacetate,
Flow rate: 1 ml/min,
Detector: Differential refractive index detector (RI), and
Molecular weight calibration: Five standard PMMAs having different molecular weights were used.

(7) Evaluation of Moisture Resistance.

A pellet sample was sufficiently dried with dry air at 120° C., placed on a hot press at 250° C. for 3 min. of heating and then subjected to application of a pressure of 8 MPa. Ca. 1 g of a sufficiently dried polymer sample was sandwiched between aluminum plates and heated for 3 min. by placing it on a heat press machine at 260° C. After being held for 1 min. under a pressure of 15 MPa, the sample was cooled by immediately transferring it to a press machine cooled with circulating water to provide a transparent amorphous pressed sheet.

The pressed sheet prepared through the above operation and in the state of being sandwiched between the aluminum plates was heat-treated at 80° C. for 10 min.

Ca. 10 mg each of sample were cut out from the above-prepared sample and left standing for prescribed periods in a vessel at constant temperature and humidity of 50° C. and 80% RH. After the prescribed periods (max. 7 days), the samples were taken out to measure molecular weights thereof by GPC.

Polymerization degrees were calculated from the thus-measured number-average molecular weights, and reciprocals thereof were plotted on a logarithmic scale versus the standing periods to take a slope of an approximate straight line of the plots as a hydrolysis rate constant.

Glycolide Syntheses Example

A stirring vessel equipped with a jacket was charged with a 70 wt. % aqueous solution of glycolic acid. The solution within the vessel was heated to a temperature of 200° C. to effect a condensation reaction while distilling off water out of the system. While reducing the pressure within the vessel stepwise, low-boiling substances such as the water formed and unreacted starting material were distilled off to obtain glycolic acid oligomer.

The thus-prepared glycolic acid oligomer was charged into a reaction vessel, diethylene glycol dibutyl ether as a solvent was added, and octyltetraethylene glycol as a solubilizing agent was further added. De-polymerization was performed under heating and a reduced pressure to distill out product glycolide and solvent together. The distilled materials were condensed in a double-pipe condenser through which warm water was circulated, and were received by a receiver. The condensate liquid was separated into two liquid layers including an upper layer of the solvent and a lower layer of glycolide. The liquid glycolide was withdrawn from the bottom of the receiver, and the glycolide was purified by a tower-type purifier. The purified glycolide thus recovered exhibited a purity of 99.99% or higher by DSC measurement.

Polymer Synthesis Example 1

Into a closable vessel (glycolide dissolution vessel) equipped with a jacket structure, 350 kg of glycolide (containing 80 ppm of glycolic acid, 200 ppm of glycolic acid dimmer and 6.4 ppm of water) produced in the above Glycolide Synthesis Example, 10.5 g of tin chloride dihydrate and 101 g of water were added to adjust a total (set) proton concentration of 0.22 mol %.

The vessel was closed, and steam was circulated in the jacket to melt the contents by heating up to 100° C. under stirring, thereby forming a uniform liquid. While keeping the temperature of the contents at 100° C., they were transferred to an apparatus comprising tubes made of a metal (SUS304) and each having an inner diameter of 24 mm. The apparatus was composed of a body part, in which the tubes were provided, and an upper plate and so constructed that both the body part and the upper plate were equipped with a jacket, and a heat transfer oil was circulated in the jacket. When the contents were transferred to this apparatus, the upper plate was fitted to close the upper opening immediately after completing the transfer.

The heat transfer oil heated to 170° C. was circulated in the jacket parts of the body part and upper plate, and the contents were held for 7 hours. After the 7 hours, the heat transfer oil circulated in the jacket parts was cooled, thereby cooling the polymerization apparatus. After the cooling, the upper plate was removed and the body part was turned upside down to take out the resultant polyglycolic acid in a bulk state. The yield reached almost 100%. The bulk product was pulverized. The resultant polymer is referred to as Polymer A.

Polymer Synthesis Example 2

As monomers, glycolide (glycolic acid 20 ppm, glycolic acid dimer 140 ppm and water 2 ppm) produced in a similar manner as in Glycolide Synthesis Example and L-lactide (lactic acid dimer 100 ppm and water 2 ppm) were used, and 10.5 g of tin dichloride dehydrate and 92 g of water were added thereto to adjust a total (set) proton concentration of 0.2 mol %, circulation of a heat transfer oil at 170° C. into jackets covering the body put and the upper plate was continued for 24 hours, and synthesis of a polymer was performed otherwise in the same manner as in Polymer Synthesis Example 1. The resultant polymer is referred to as Polymer B.

Polymer Synthesis Example 3

A polymer was synthesized in the same manner as in Polymer Synthesis Example 1 except for continuing the circulation of a heating oil at 170° C. into the jackets covering the body part and the upper plate for 7 hours. The resultant polymer is referred to as Polymer C.

Pellet Production Example 1

100 wt. parts of a sufficiently dried polymer produced in the manner of any of Polymer Synthesis Examples 1-3, was blended with 0.03 wt. part of mono- and di-stearyl acid phosphate ("ADEKASTAB AX-71", made by Asahi Denka Kogyo K.K.; referred to as "Additive I") and melt-kneaded together by using an extruder to obtain pellets.

<Extrusion Conditions>
Extruder: "TEM-41SS" made by Toshiba Kikai K.K.
Screws: Equi-directional, L/D=41.5, Speed 40 rpm.
Temperature conditions: Maximum 240° C.
Extrusion rate: 30 kg/h Pellet Production Example 2

Pellets were produced in the same manner as in Pellet Production Example 1 except that 100 wt. parts of a sufficiently dried polymer produced in the manner of any of Polymer Synthesis Examples 1-3, was blended with 0.03 wt. part of mono- and di-stearyl acid phosphate ("ADEKASTAB AX-71", made by Asahi Denka Kogyo K.K.; "Additive I") and additionally with 1 wt. part of N,N-2,6-diisopropyl-phenylcarbodiimide (CDI) ("DIPC", made by Kawaguchi Kagaku Kogyo K.K.; referred to at "Additive II").

Release Removal Example 1 (Heat-Treatment Method 1)

A polymer sample was placed in a stainless steel-made shallow vat and placed in a drier ("DN-61", made by K.K. Yamato, or "Mini-Jet Oven", made by Toyama Sangyo K.K.) into which dry air (having a dew point of −50° C. or below) was blown, for a prescribed time of heat-treatment. After the prescribed time, the sample was cooled to room temperature in the drier to provide a heat-treated sample.

Release Removal Example 2 (Heat-Treatment Method 2)

A polymer sample was placed in a stainless steel-made shallow vat and placed in a drier ("ADP-31", made by K.K. Yamato") capable of retaining a reduced pressure therein by the action of a vacuum pump connected via an exhaust pipe and a glass-made receiver, for a prescribed time of heat-treatment. After the prescribed time, the sample was cooled to room temperature in the drier to provide a heat-treated sample.

Examples and Comparative Examples are shown below and the evaluation results are shown in Tables 1-4.

Examples 1, 2 and Comparative Examples 1-4

Polymer A was heat-treated under a reduced pressure of 0.05 mmHg (Heat-treatment method 2) to provide a polymer of Example 1 and separately heat-treated under normal pressure (Heat-treatment method 1) to provide a polymer of Example 2. Polymer A itself without heat treatment was evaluated as a polymer of Comparative Example 1. Polymer C was heat-treated under a reduced pressure of 0.05 mm Hg (Heat treatment method 2) to provide a polymer of Comparative Example 2 and separately heat-treated under normal pressure (Heat-treatment method 1) to provide a polymer of Comparative Example 3. Polymer C itself without heat treatment was evaluated as a polymer of Comparative Example 4. These polymers of Examples 1, 2 and Comparative Examples 1-4 were not pelletized but used in their pulverized states for evaluation of various properties. The results are shown in Table 1.

Example 3, 4 and Comparative Example 5

Polymer A was pelletized according to the method of Pellet Production Example 1 and heat-treated under a reduced pressure of 0.05 mmHg (Heat-treatment method 2) to provide a polymer of Example 3, and separately heat-treated under normal pressure (Heat-treatment method 1) to provide a polymer of Example 4. Further, Polymer A was pelletized but not heat-treated to provide a polymer of Comparative Example 5. The evaluation results are shown in Table 2.

Example 5-10 and Comparative Example 6

Polymer A was pelletized according to the method of Pellet Production Example 2 and heat-treated under a reduced pressure of 0.05 mmHg (Heat-treatment method 2) to provide a polymer of Example 5, and separately heat-treated under normal pressure (Heat-treatment method 1) to provide polymers of Examples 6-10. Further, Polymer C was pelletized according to the method of Pellet Production Example 2 but not heat-treated to provide a polymer of Comparative Example 6. The evaluation results are shown in Table 3.

Example 11, 12 and Comparative Example 7

Polymer B was pelletized according to the method of Pellet Production Example 1 and heat-treated under normal pressure (Heat-treatment method. 1) to provide a polymer of Example 11. Separately Polymer B was pelletized according to the method of Pellet Production Example 2 and heat-treated under normal pressure (Heat-treatment method 1) to provide a polymer of Examples 12. Further, Polymer B was pelletized according to the method of Pellet Production Example 1 but not heat-treated to provide a polymer of Comparative Example 7. The evaluation results are shown in Table 4.

TABLE 1

|  |  | Example | | | | | |
| --- | --- | --- | --- | --- | --- | --- | --- |
|  |  | 1 | 2 | Comp. 1 | Comp. 2 | Comp. 3 | Comp. 4 |
| Polymer |  | A | A | A | C | C | C |
| Polymerization temp. | ° C. | 170 | 170 | 170 | 230 | 230 | 230 |
| Heat-treatment |  | 2 (RP) | 1 (NP) | none | 2 (RP) | 1 (NP) | none |
| Heat-treatment temp. | ° C. | 160 | 150 | none | 160 | 150 | none |
| Heat-treatment time | hours | 24 | 24 | none | 24 | 24 | none |
| Residual glycolide content | wt. % | 0.16 | 0.18 | 0.35 | 0.36 | 0.40 | 1.0 |
| weight-average molecular weight |  | 225300 | 216700 | 204900 | 121100 | 117900 | 138600 |
| Melt viscosity | Pa·s | 1730 | 1490 | 1800 | 580 | 550 | 950 |

TABLE 1-continued

|  |  | Example | | | | | |
|---|---|---|---|---|---|---|---|
|  |  | 1 | 2 | Comp. 1 | Comp. 2 | Comp. 3 | Comp. 4 |
| Hydrolysis rate constant | $10^{-6} sec^{-1}$ | 3.9 | 4.0 | 4.4 | 5.2 | 5.3 | 6.2 |

* RP: reduced pressure
NP: normal pressure

TABLE 2

|  |  | Example | | |
|---|---|---|---|---|
|  |  | 3 | 4 | Comp. 5 |
| Polymer |  | A | A | A |
| Polymerization temp. | ° C. | 170 | 170 | 170 |
| Additive I | wt. part | 0.03 | 0.03 | 0.03 |
| Heat-treatment |  | 2 (RP) | 1 (NP) | none |
| Heat-treatment temp. | ° C. | 160 | 150 | none |
| Heat-treatment time | hours | 24 | 24 | none |
| Residual glycolide content | wt. % | 0.12 | 0.13 | 0.33 |
| weight-average molecular weight |  | 213800 | 204700 | 203800 |
| Melt viscosity | Pa · s | 1900 | 1640 | 1980 |
| Hydrolysis rate constant | $10^{-6} sec^{-1}$ | 3.8 | 3.9 | 4.3 |

* RP: reduced pressure
NP: normal pressure

TABLE 3

|  |  | Example | | | | | | |
|---|---|---|---|---|---|---|---|---|
|  |  | 5 | 6 | 7 | 8 | 9 | 10 | Comp. 6 |
| Polymer |  | A | A | A | A | A | A | C |
| Polymerization temp. | ° C. | 170 | 170 | 170 | 170 | 170 | 170 | 230 |
| Additive I | wt. part | 0.03 | 0.03 | 0.03 | 0.03 | 0.03 | 0.03 | 0.03 |
| Additive II | wt. part | 1 | 1 | 1 | 1 | 1 | 1 | 1 |
| Heat-treatment |  | 2 (RP) | 1 (NP) | 1 (NP) | 1 (NP) | 1 (NP) | 1 (NP) | none |
| Heat-treatment temp. | ° C. | 160 | 170 | 170 | 170 | 220 | 220 | none |
| Heat-treatment time | hours | 24 | 5.0 | 10 | 15 | 2 | 5.5 | none |
| Residual glycolide content | wt. % | 0.12 | 0.12 | 0.07 | 0.06 | 0.04 | ND | 0.96 |
| weight-average molecular weight |  | 216200 | 207300 | 202900 | 216900 | 200300 | 200500 | 136100 |
| Melt viscosity | Pa · s | 2060 | 2080 | 2060 | 2040 | 1960 | 1600 | 880 |
| Hydrolysis rate constant | $10^{-6} sec^{-1}$ | 2.9 | 2.8 | 2.6 | 2.4 | 2.3 | 2.2 | 5.0 |

* RP: reduced pressure
NP: normal pressure
* ND in the row of Residual glycolide content represents a content below a detection limit (0.02 wt. %).

TABLE 4

|  |  | Example | | |
|---|---|---|---|---|
|  |  | 11 | 12 | Comp. 7 |
| Polymer |  | B | B | B |
| Polymerization temp. | ° C. | 170 | 170 | 170 |
| Additive I |  | 0.03 | 0.03 | 0.03 |
| Additive II |  | 1 | 1 | 1 |
| Heat-treatment |  | 1 (NP) | 1 (NP) | none |
| Heat-treatment temp. | ° C. | 210 | 210 | none |
| Heat-treatment time | hours | 3 | 6 | none |
| Residual glycolide content/residual lactide content | wt. % | 0.04/0.01 | 0.03/0.02 | 0.20/0.22 |
| weight-average molecular weight |  | 204100 | 216800 | 223700 |
| Melt viscosity | Pa · s | 1300 | 1400 | 1880 |
| Hydrolysis rate constant | $10^{-6} sec^{-1}$ | 3.5 | 2.4 | 4.4 |

* NP: normal pressure

INDUSTRIAL APPLICABILITY

As described above, according to the present invention, it becomes possible to produce an aliphatic polyester with a minimized residual cyclic ester content and with stable properties in a process of producing an aliphatic polyester by ring-opening polymerization of a cyclic ester by proceeding with a latter half of polymerization by way of solid-phase polymerization and then effecting removal of residual monomer.

The invention claimed is:
1. A process for producing an aliphatic polyester with a reduced content of residual cyclic ester, comprising:
producing an aliphatic polyester by ring-opening polymerization of a cyclic ester comprising glycolide or a mix- ture of glycolide and lactide containing 70 wt. % or more of the glycolide, wherein the polymerization proceeds in the presence of a metallic catalyst selected from the group consisting of oxides, chlorides, carboxylates and alkoxides of tin (Sn), titanium (Ti), aluminum (Al), antimony (Sb), zirconium (Zr) and zinc (Zn), and a latter period of the polymerization proceeds by solid-phase polymerization, pelletizing the aliphatic polyester after the polymerization together with a thermal stabilizer, and then contacting the pelletized aliphatic polyester containing the thermal stabilizer with a flowing heated dry gas at 150-220° C. for 2-24 hours under normal pressure while retaining the pelletized aliphatic polyester in its solid state, thereby entraining residual cyclic ester with the gas and reducing the content of residual cyclic ester in the aliphatic polyester down to 0.02-0.13 wt. % below 0.2 wt. %.

2. The production process according to claim 1, wherein solid-phase polymerization is performed at a temperature of below 195° C.

3. The production process according to claim 1, wherein the aliphatic polyester subjected to the removal of residual cyclic ester is in a form of particles having a diameter of at most 8 mm.

4. The production process according to claim 1, wherein the pelletized aliphatic polyester is in a particle form having a diameter of at most 8 mm.

5. The production process according to claim 1, wherein the heated dry gas is at a temperature of 170-220° C. for 2-15 hours.

* * * * *